United States Patent Office 3,463,431
Patented Aug. 26, 1969

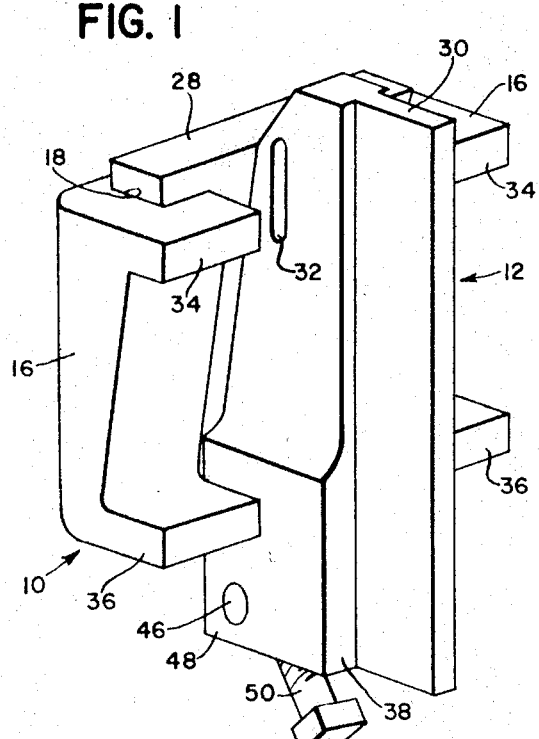
FIG. 1
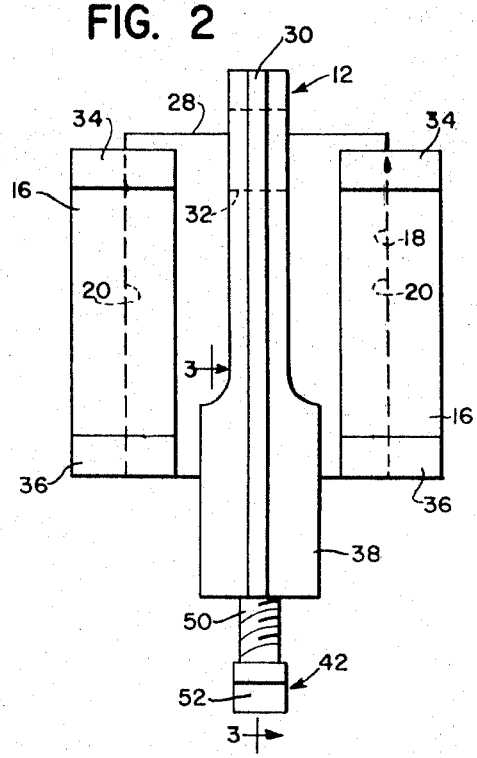
FIG. 2
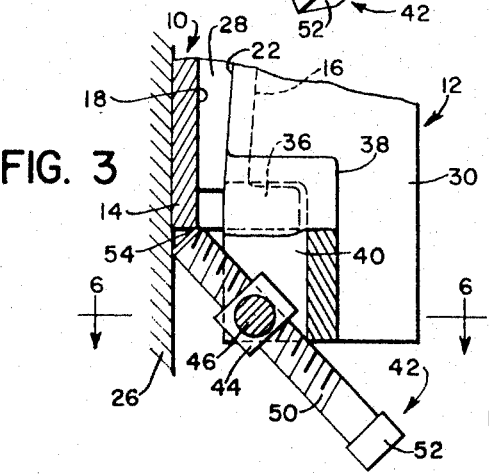
FIG. 3
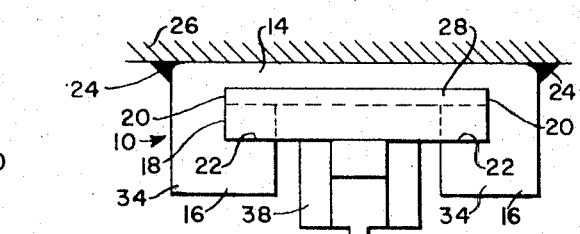
FIG. 4
FIG. 5
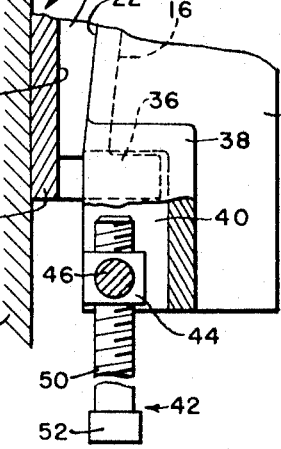
FIG. 6
INVENTOR.
C. G. MATSON

3,463,431
WEDGE POCKET VIBRATOR MOUNTING
Carl G. Matson, 401 E. Central Blvd.,
Kewanee, Ill. 61443
Filed Nov. 2, 1967, Ser. No. 680,209
Int. Cl. B65g 67/24; F16m 1/00
U.S. Cl. 248—224                                2 Claims

ABSTRACT OF THE DISCLOSURE

A wedge pocket type of mounting for a vibrator useful in the field of materials-handling, in which a male member is insertable in the pocket of a female member and drawn therein and held in place by screw means as distinguished from the usual cross wedge means.

Background of the invention

The use of vibrators in the materials-handling field is well known, exemplified mainly by the application, to an object to be vibrated, of a vibrator unit, usually of the rotating eccentric weight type, for the purpose of facilitating the flow, settling, loading, unloading, compacting, etc. of fluent material such as sand, gravel, coal concrete and the like. A typical object to be vibrated may comprise a hopper, chute, railway car or similar receptacle or materials container. In the case of railway hopper cars, where the material is discharged from inverted truncated pyramidal hoppers, it has been common practice to provide on such hoppers a female member in the form of the so-called Gardner or Tyler type, one example of which is disclosed in the U.S. Peterson patent, 3,003,733, into which is inserted a male complementarily wedge-shaped member having a flange or web thereon for mounting a vibrator unit by means of suitable clamps, etc. In a Gardner-Tyler mounting, the male member usually has a cross slot through which a cross wedge is driven for cooperation with lugs or similar abutments on the female pocket so as to force the male member into the female member and to secure the same in place and against loosening during operation of the vibrator.

Although this type of mounting has been fairly successful over the recent past, experience has demonstrated some of the inherent difficulties such as those that result from loosening of the cross wedge under heavy duty operation, especially with rotary vibrators, of course incurring failure of the main wedging action and consequent loss or at least partial destruction of the vibrator unit because it becomes extremely loose and tears itself from the mount unless it is closely supervised.

Summary of the invention

According to the present invention, the wedge mounting is significantly improved by the provision of screw means that replaces the cross wedge means as the device for tightening and securing the male part into the female pocket. The invention features the use of the screw means preferably as part of the male member and operable to act against the female part so as to draw the male member securely into place, utilizing and improving the inherent wedging function. Still further, the screw means is designed so as to operate at a highly efficient angle that takes advantage of the compound wedging surfaces built into the cooperative parts. Moreover, the screw means is pivotally mounted so that it may be swung to a position enabling quick and easy withdrawal of the male part for use in other female parts at other locations on the same or other objects to be vibrated. The design is also such that existing mounts may be readily modified to incorporate the inventive screw means. In a preferred embodiment, the screw means is housed at least in part in the male part and presents a tool-receiving head that it readily accessible for tightening and loosening.

Description of the drawings

FIG. 1 is a perspective of the assembled mount;
FIG. 2 is a front view of the same;
FIG. 3 is a section on the line 3—3 of FIG. 2;
FIG. 4 is a plan of FIG. 2;
FIG. 5 is a section like FIG. 3 but shows the screw released; and
FIG. 6 is a section on the line 6—6 of FIG. 3.

Description of a preferred embodiment

The vibrator mount comprises basically two parts, one a female part 10 and the other a male part 12, the former having a rear mounting wall 14 and a pair of integral forward portions 16 that give the part a generally channel shape as seen from above (FIG. 4) and defining a wedge-shaped pocket 18 having interior side walls 20 and interior walls 22 in the front portions 16 that converge downwardly as respects the flat front interior face of the rear wall 14. The female part 10 may follow known wedge pocket construction and, as is also known, the part 10 may be fixed, as by welding at 24 or by other suitable means, to the object to be vibrated, here designated at 26.

The male part 12 is essentially of one-piece construction so far as concerns a wedge-shaped flange 28 that fits or is complementary to the pocket 18 and a mounting flange 30 centrally of and normal to the flange 28. The flange 30 is of uniform thickness and is somewhat elongated for the purpose of receiving a vibrator having two pairs of bifurcated legs and clamp screws, not shown here but illustrated in many prior patents, such as in the Peterson patent noted above. The male part 12 could also be an integral part of the vibrator. In a typical arrangement, the part 12 would be welded, say, to the discharge hopper of a railway car and the male part would be inserted and driven home with a sledge or by the use of cross wedges or the like as shown in said Peterson patent. The vibrator is then, or may have been previously, attached to the flange or rib 30 and the system is ready for use. The part 12 is upwardly removable from the female part 10 by driving it upwardly with a sledge or again by the use of a cross wedge. A vertical through slot 32 is shown in the male part 12 for receiving a removal wedge, which is passed through the slot and over lugs 34 integral with the front portions 16 of the part 10. In the instance illustrated here, the female part 10 is or may be of prior construction and has lower lugs 36 for use with a lower slot usually provided in the prior art male part but not shown here because it is unnecessary in view of the present invention.

Because of its tapered construction, the male part flange 28 has a larger upper end and a smaller lower end, these directional expressions being used here only by way of brevity and clarification and not by way of limitation, since, obviously, the arrangement can occupy any of several positions. On that basis, then, it will be observed that the mounting flange 30 includes at its lower end (the smaller end of the male part) an integral enlarged portion 38 that is interiorly hollow to provide a recess 40 within which is housed, for the most part, the inventive screw means, designated in its entirety by the numeral 42.

This screw means includes an internally threaded block or nut 44 carried on a pair of coaxial pintles or bearings 46 in opposed walls 48 of the recess 40. An externally threaded member or screw 50 having a square head 52 or other appropriate tool-receiving portion is threaded through the nut 44 and, when the parts are assembled, is capable of engaging the lower end of the female part as at 54, preferably at about the angle shown, because this helps to overcome minor differences in taper between the mating surfaces of the parts 10 and 12. That is to say, the screw exerts forces both downwardly and outwardly. Broadly, however, the screw could exert a downward force only and could be reversed as to location so as to act on the male part and react on the female part. However, the present arrangement has the advantage that the screw head 52 is easily accessible, which is made even more so because of the angle of the screw as shown.

The pivotal mounting of the screw by means of the pivoted block or nut 44 facilitates removal of the male part from the pocket 18, since the screw may be loosened and swung from its FIG. 3 position to that of FIG. 5 so that its free end easily clears the lower portion 54 of the female part. Since the major part of the weight of the screw will then be below the pivots 46, 46, it depends pendulum fashion and does not interfere with walls of the female part during disassembly. This same feature is available during insertion of the male part, following which it is necessary only to swing the screw to the position of FIG. 3 and tighten same. The pivotal mounting is an added feature, for it will be clear that the screw will perform its clamping or drawing-in function even though non-pivotally mounted.

A disadvantage of the wedge-locked constructions of the prior art is that the locking wedge becomes loose as a result of the rotary action of the vibrator. hen this wedge loosens and drops out, the main wedging action also deteriorates and the male part, unless detected in time, completely disengages from the female part, with consequent damage, loss of efficiency etc. It has been discovered that the rotary action of the vibrator has no loosening effect on the screw means 42 and therefore the clamping action, once secured, remains until deliberately untightened. A further feature of the invention is that only the male part, for example, need be modified and such part will fit female parts already in use or available for use, since the screw means needs only an abutting contact with a portion of the female part in order to operate as a wedge-tightener and retainer. The construction is simple and compact, lends itself to production in quantity at low cost, and presents few if any maintenance problems.

I claim:
1. A vibrator mount including a female part adapted to be rigidly affixed to an object to be vibrated and having a generally channel-shaped configuration to provide a downwardly convergent wedge-shaped pocket, said part including a lower abutment at the smaller end of said pocket, a male part of complementary wedge shape and downwardly insertible into and upwardly withdrawable from said pocket and having a lower end projecting downwardly beyond said abutment when inserted into said pocket, said lower end having a recess including an open bottom and an open interior side facing toward said abutment, and screw means carried by said lower end for acting against said abutment to draw the male part into the female part, said screw means including a cross member carried by and within the recess and having an internally threaded through bore opening to the bottom and interior side of the recess, and a screw threaded through the bore and having an inner end engageable with the abutment and an outer force-receivable end accessible via the bottom of the recess.

2. The invention defined in claim 1, in which the cross member is rockable in the recess so that the screw is selectively swingable through an angular range relative to said abutment.

References Cited

UNITED STATES PATENTS

| 1,704,973 | 3/1929 | Juul | 248—187 X |
| 3,003,733 | 10/1961 | Peterson | 248—224 |
| 3,228,037 | 1/1966 | Winkler | 248—224 X |

FOREIGN PATENTS

| 58,363 | 11/1953 | France. |
| 1,041,247 | 9/1966 | Great Britain. |

ROY D. FRAZIER, Primary Examiner

J. FRANKLIN FOSS, Assistant Examiner

U.S. Cl. X.R.

214—64.2; 248—14